United States Patent
Pankratov (10) Patent No.: US 11,391,157 B1
(45) Date of Patent: Jul. 19, 2022

(54) DAMPED ROTOR ASSEMBLY

(71) Applicant: PRATT & WHITNEY CANADA CORP., Longueuil (CA)

(72) Inventor: Maksim Pankratov, Saint-Amable (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/209,309

(22) Filed: Mar. 23, 2021

(51) Int. Cl.
*F01D 5/06* (2006.01)
*F02C 7/06* (2006.01)
*F01D 25/16* (2006.01)

(52) U.S. Cl.
CPC .......... *F01D 5/066* (2013.01); *F01D 25/162* (2013.01); *F02C 7/06* (2013.01); *F05D 2260/31* (2013.01)

(58) Field of Classification Search
CPC .......... F01D 5/066; F01D 25/162; F01D 5/10; F01D 5/027; F02C 7/06; F05D 2260/31; F05D 2260/96
See application file for complete search history.

(56) References Cited

U.S. PATENT DOCUMENTS

| | | | |
|---|---|---|---|
| 4,108,571 A | 8/1978 | Mawson | |
| 4,817,455 A | 4/1989 | Buxe | |
| 4,848,182 A | 7/1989 | Novotny | |
| 5,373,922 A | 12/1994 | Marra | |
| 5,582,077 A | 12/1996 | Agram | |
| 6,478,544 B2 | 11/2002 | Brandi et al. | |
| 7,217,100 B2 | 5/2007 | Benderradji et al. | |
| 7,458,769 B2 | 12/2008 | Forgue et al. | |
| 8,167,563 B2 | 5/2012 | Kayser | |
| 8,328,519 B2 | 12/2012 | Denis et al. | |
| 8,747,054 B2 | 10/2014 | Witlicki | |
| 8,979,502 B2 * | 3/2015 | Paquet | F01D 5/3015 416/244 A |
| 9,151,170 B2 | 10/2015 | El-Aini et al. | |
| 9,970,321 B2 * | 5/2018 | Nguyenloc | F01D 25/162 |
| 2013/0004313 A1 | 1/2013 | El-Aini | |
| 2014/0314578 A1 | 10/2014 | Xu | |
| 2020/0392849 A1 | 12/2020 | Di Paola et al. | |
| 2021/0070423 A1* | 3/2021 | Weaver | F16H 57/082 |

* cited by examiner

*Primary Examiner* — Courtney D. Heinle
*Assistant Examiner* — Andrew Thanh Bui
(74) *Attorney, Agent, or Firm* — Norton Rose Fulbright Canada LLP (57) ABSTRACT

A rotor assembly comprises a first body and a second body extending about a rotation axis. The first body has an inner surface, a seat surrounded by the inner surface, and a groove extending circumferentially into the inner surface. The second body has an outer surface surrounded by the inner surface. An annular gap is defined radially between the inner surface and the outer surface and axially between the seat and the groove. A locking washer is mounted in anti-rotational engagement with the inner surface and the outer surface relative to the rotation axis. A split ring is disposed in the annular gap. The split ring is resiliently expandable radially outwardly under centrifugal load such that expanding the split ring radially against the groove axially deflects the split ring toward the seat relative to the first body and to the second body so as to axially load the locking washer against the seat.

20 Claims, 4 Drawing Sheets

DAMPED ROTOR ASSEMBLY

TECHNICAL FIELD

The application relates generally to gas turbine engine rotor assemblies and, more particularly, to friction damping arrangements for gas turbine engine rotor assemblies.

BACKGROUND OF THE ART

Gas turbine engines have rotors (e.g., turbine or compressor rotating parts such as discs, seal runners, etc.) which are subjected to high vibratory stress in some cases due to vibratory excitation originating from nearby engine components mechanically connected thereto. Conventionally, rotor components subject to undesirable vibration can be structured and arranged so as to inherently provide vibration damping. For example, a shape and/or a mass distribution of the rotor component bearing the vibration may be modified such that a natural frequency of the rotor component is differentiated with respect to a vibrating frequency of the nearby component imparting the vibration. However, the suitability of this approach may be tributary to the presence of sufficient dimensional clearance for the modification to be made, and may be contingent on the satisfaction of mechanical resistance requirements.

SUMMARY

In one aspect, there is provided a gas turbine engine rotor assembly having a rotation axis, the rotor assembly comprising: a first body about the rotation axis, the first body having an inner surface radially inward relative to the rotation axis and a seat axially inward the first body and surrounded by the inner surface, the first body having a groove extending circumferentially into the inner surface and spaced axially from the seat, the groove having an inner groove edge proximate to the inner surface and an outer groove edge circumscribing the groove radially outward of the inner surface, the groove at a rated axial location of the first body between the inner groove edge and the outer groove edge facing toward the seat at a normal angle relative to the rotation axis; a second body about the rotation axis, the second body having an outer surface radially outward relative to the rotation axis and surrounded by the inner surface, an annular gap defined radially between the inner surface and the outer surface and axially between the seat and the groove; a locking washer about the rotation axis in anti-rotational engagement with the inner surface and the outer surface relative to the rotation axis, the locking washer having axially opposite first and second washer surfaces in the annular gap, the first washer surface adjacent to the seat; and a split ring disposed about the rotation axis in the annular gap adjacent to the second washer surface, the split ring having an outer ring edge radially outward relative to the rotation axis, the outer ring edge located inside the groove radially inward of the outer groove edge, the split ring radially engaging the groove at the axial location and resiliently expandable radially outwardly under centrifugal load relative to the rotation axis such that expanding the split ring radially against the groove axially deflects the split ring toward the seat relative to the first body and to the second body so as to axially load the locking washer against the seat.

In accordance with another aspect there is provided a gas turbine engine rotor assembly defining a rotation axis, the rotor assembly comprising: a nut about the rotation axis, the nut having a recess defined radially by an inner nut surface radially inward relative to the rotation axis, a seat inside the recess axially inward the nut and surrounded by the inner nut surface, the nut having a groove spaced axially from the seat and extending radially outwardly into the inner nut surface, the groove having an outer groove edge circumscribing the groove and a groove ramping surface radially inward of the outer groove edge, the groove ramping surface tapering radially inwardly from an outer ramp edge to an inner ramp edge; a shaft about the rotation axis in the recess, the shaft having an outer shaft surface radially outward relative to the rotation axis and surrounded by the inner nut surface, an annular gap defined radially between the inner nut surface and the shaft outer surface and axially between the seat and the groove; a locking washer about the rotation axis in anti-rotational engagement with the inner nut surface and the shaft outer surface relative to the rotation axis, the locking washer having axially opposite first and second washer surfaces in the annular gap, the first washer surface adjacent to the seat; and a split ring disposed about the rotation axis in the annular gap adjacent to the second washer surface, the split ring having an outer ring edge radially outward relative to the rotation axis, the outer ring edge located inside the groove radially inward of the outer groove edge, the split ring radially engaging the groove ramping surface, the split ring resiliently expandable radially outwardly under centrifugal load relative to the rotation axis such that expanding the split ring radially against the groove ramping surface axially deflects the split ring toward the seat relative to the nut and to the shaft so as to axially load the locking washer against the seat.

DESCRIPTION OF THE DRAWINGS

Reference is now made to the accompanying figures in which.

DETAILED DESCRIPTION

Figure 1:
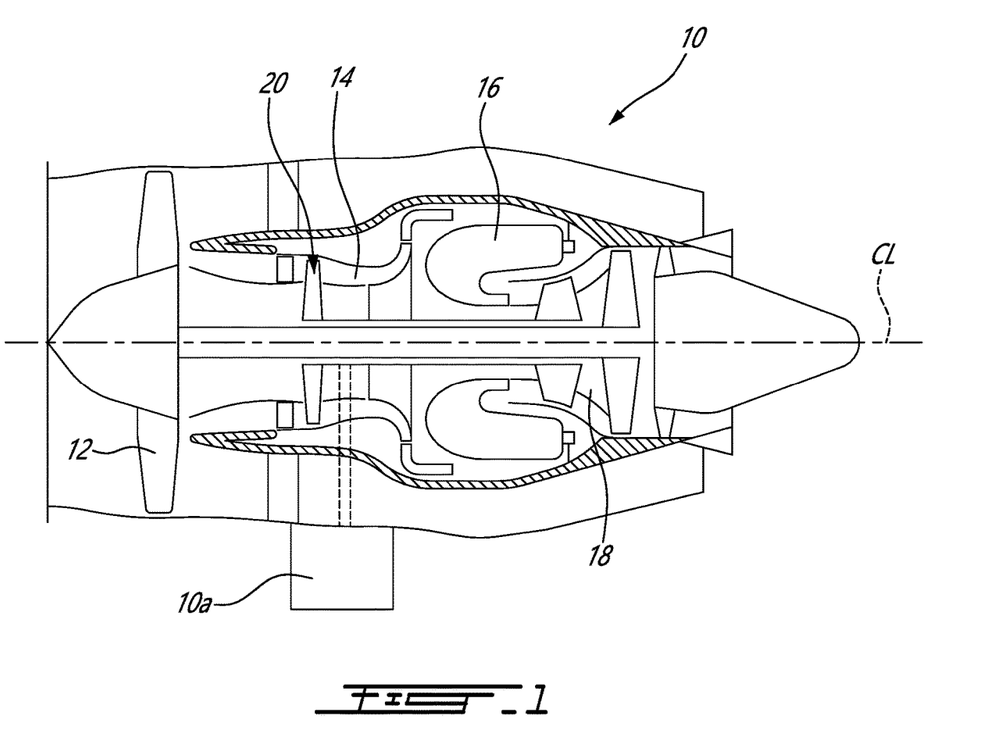
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A shaft of the engine 10 is shown about an axis CL, around which rotary parts of the engine 10 are mounted to be rotatable with the shaft about the axis CL. Other such rotary parts are rotatable about an axis remote from the axis CL, for example parts located in an accessory gearbox 10*a* of the engine 10. Typically, pairs of rotationally-interlocked rotary parts are held at an axial location along their corresponding rotation axis via a fastening means disposed directly adjacent thereto or spaced therefrom by a neighboring rotary part. A rotor assembly of so interlocked parts is generally shown at 20. Depending on the implementation, such rotor assemblies 20 may comprise one or more types of rotationally-interlocked rotary parts, for example bearings, seal runners, gears, and discs such as those found in the compressor and turbine sections 14, 18.

Figure 2:
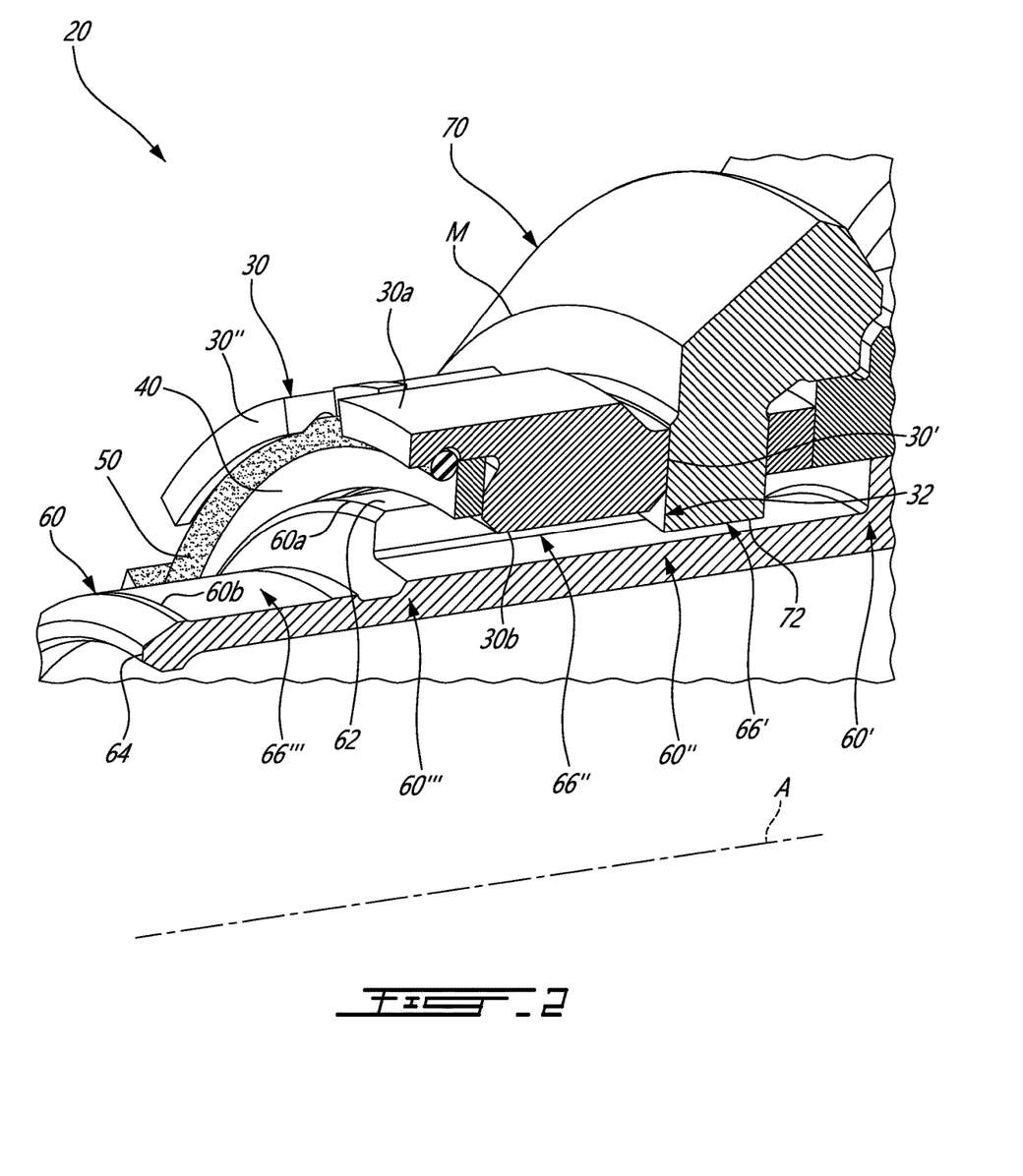
FIG. 2 is an isometric, cross-section view of a portion of an embodiment of a rotor assembly of the gas turbine engine of FIG. 1, the portion including a shaft, a nut, a locking washer and a split ring of the rotor assembly, shown with the nut, the locking washer and the split ring mounted relative to the shaft about an axis.
Figure 3:
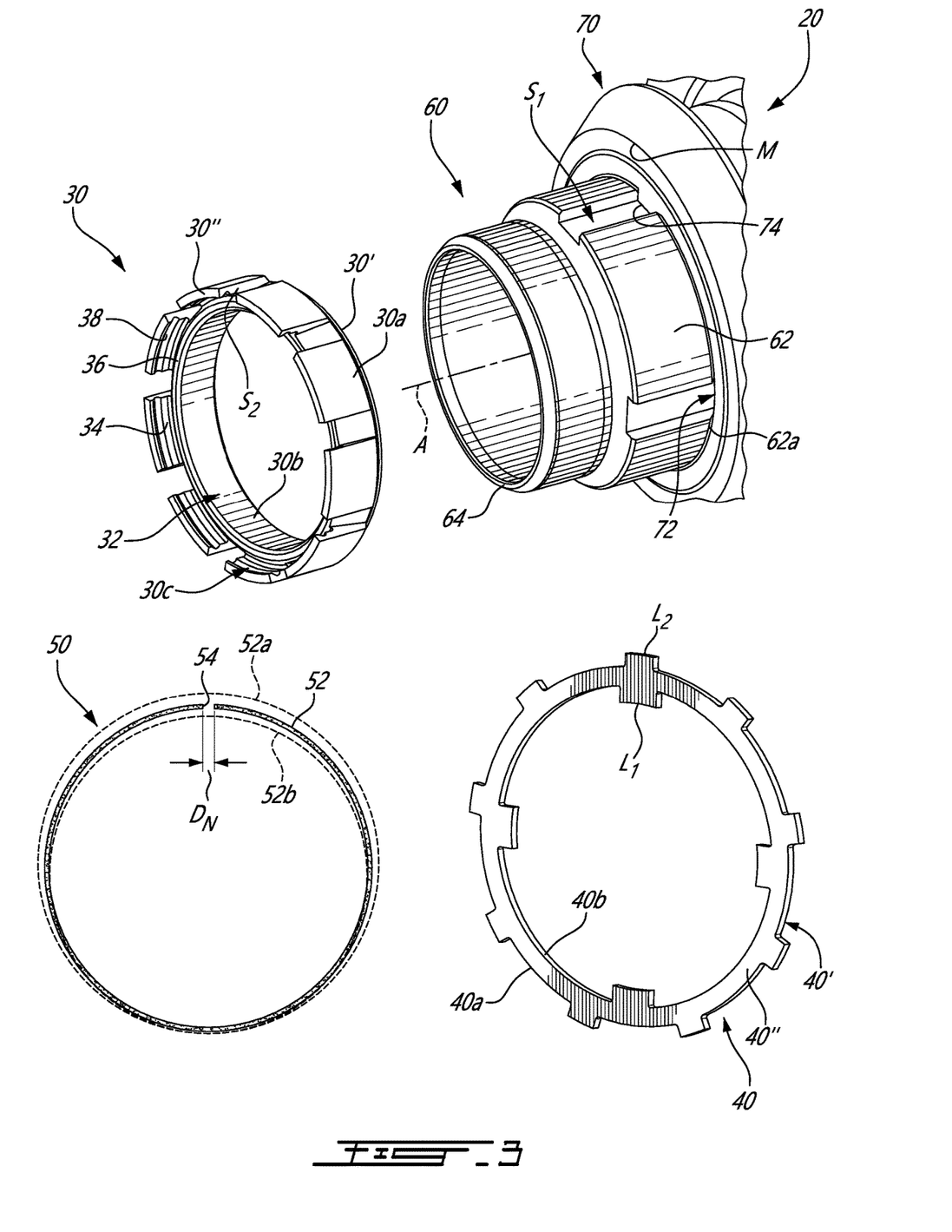
FIG. 3 is an isometric view of the portion of the rotor assembly of FIG. 2, shown with the nut, the locking washer and the split ring removed from the shaft.

Referring to FIGS. 2 and 3, the rotor assembly 20 will now be generally described. The rotor assembly 20 comprises a fastening means including a nut 30, a locking washer 40 and a split ring 50, a shaft 60 about which the fastening means is disposed, and a neighboring rotary part provided in the form of a gear 70, also disposed about the shaft 60 and held in place by the fastening means. The shaft 60 is rotatable about a rotation axis A, and the fastening means and the gear 70 are mounted to the shaft 60 so as to be rotatable with the shaft 60. Broadly speaking, the rotor assembly 20 includes a first body and a second body that are rotationally-interlocked relative to the rotation axis A by the locking washer 40, in this case the nut 30 and the shaft 60. At least one of the first body and the second body imparts the locking washer 40 with vibratory excitation, in this case originating from the gear 70. As will be described in greater detail hereinbelow, the rotor assembly 20 is arranged such that the vibratory excitation is mitigated by subjecting the locking washer 40 to frictional damping.

The shaft 60 has a radially inner shaft surface surrounding a hollow interior, and a radially outer shaft surface 62 (also referred to as an outer surface of the second body) sized and arranged for receiving the gear 70, the nut 30, the washer 40 and the ring 50 therearound. Along a distal portion of the shaft 60 defined between a first axial location 60' and an end 64 of the shaft 60, the outer shaft surface 62 is shaped for the gear 70 to be slidably receivable therealong. For instance, the outer shaft surface 62 has an outer shaft diameter 60*a* sized to establish a suitable fit between the outer shaft surface 62 and a bore 72 of the gear 70. Also, in order to accommodate projections, or lugs 74, of the gear 70 projecting radially inwardly into the bore 72, the shaft 60 is provided with slots S1 in the outer shaft surface 62. The slots S1, also referred to as inner slots or shaft slots, are shaped and circumferentially spaced complementarily to the lugs 74 of the gear 70, and extend away from the end 64 of the shaft 60 to the first axial location 60' of the shaft 60. The gear 70, once mounted in position relative to the shaft 60, extends from the first axial location 60' to a second axial location 60" of the shaft 60. A portion of the outer shaft surface 62 extending between the first and second axial locations 60', 60" can be referred to as a first mounting location 66' of the shaft 60. The gear 70 has a meshing diameter defined radially outwardly relative to the rotation axis A, at which the gear 70 meshes with a subsequent gear (not shown) of the engine 10 located radially outward of the meshing diameter M. Next to the first mounting location 66', a second mounting location 66" extends from the second axial location 60" toward the end 64 of the shaft 60. A boundary of the second mounting location 66" opposite the second axial location 60" is defined at a third axial location 60''' of the shaft 60. The shaft 60 is in this case recessed relative to the outer shaft surface 62 as it extends from the end 64 to the third axial location 60''', i.e., has a recessed shaft diameter 60*b* that is smaller than the outer shaft diameter 60*a*. The portion of the shaft 60 extending between the end 64 and the third axial location 60''' may be referred to as a third mounting location 66''' of the shaft 60 at which the shaft 60 is supported about the axis A, for example by a bearing.

At the second mounting location 66", the outer shaft surface 62 is shaped for the nut 30 to be fastenable thereto. The outer shaft surface 62, in this case being similarly sized at both the first and second mounting locations 66' 66", is provided with threads (not shown) for the nut 30 to me threadably secured to the shaft 60. Relative to the axis A, the nut 30 extends axially away from the gear 70 between a first nut side 30' facing the gear 70 and a second nut side 30" facing away from the gear 70. The nut 30 extends radially inwardly from a radially outer nut surface 30*a* defining an outermost nut diameter to a radially innermost nut surface 30*b* defining an innermost nut diameter surrounding a bore 32. It shall be noted that adjacent to the first nut side 30', the outer nut surface 30*a* is radially inward of the meshing diameter M of the gear 70, and in this case constricts radially inwardly relative to the outermost nut diameter. The innermost nut surface 30*b* is threaded to be fastenable to the shaft 60 at the second mounting location 66". From the second nut side 30", the nut 30 defines an annular recess 30*c* extending axially toward the first nut side 30' and surrounding the bore 32. In the recess 30*c*, an inner nut surface 34 of the nut 30 (also referred to as an inner surface of the first body) defines a radially outer boundary of the recess 30*c*. At a first axial location of the nut 30 along the inner nut surface 34, a radially extending surface of the nut 30 defines an outwardly facing, axial boundary of the recess 30*c* referred to as a seat 36. At a second axial location of the nut 30 spaced axially outwardly from the first axial location, a circumferential groove 38 is defined radially outwardly into the inner nut surface 34. The nut 30 has circumferentially spaced apart slots S2 defined into the inner nut surface 34, with each slot S2 extending axially from the second nut side 30" and across the groove 38 to radially outward of the seat 36 at the first axial location. The slots S2 are also referred to as outer slots or nut slots.

The washer 40 is characterized as "locking" due to having a washer-like, annular body providing with radially outer projections and radially inner projections sized and arranged complementarily to features of outer and inner rotary components respectively surrounding the annular body and surrounded by the annular body to rotationally interlock such components via the washer 40. The annular body of the washer 40 extends radially between an outer washer surface 40*a* having an outer washer diameter and an inner washer surface 40*b* having an inner washer diameter. In this embodiment, the annular body forms a solid, annular portion of the washer 40 that extends radially between the seat 36 and the ring 50. A shape and a mass of the annular portion may be configured so as to impart the washer 40 with a natural frequency being suitable for mitigating resonance with regard to a certain undesirable vibration frequency, for example a frequency at which teeth of the gear 70 mesh with corresponding teeth of the subsequent gear at the meshing diameter M. In this particular implementation of the washer 40, the inner washer surface 40*b* is sized so as to circumscribe a second radial gap defined around the outer shaft surface 62. The washer 40 has inner lugs L1 projecting radially inwardly from the inner washer surface 40*b*, and outer lugs L2 projecting radially outwardly from the outer washer surface 40*a*. The inner lugs L1 and the outer lugs L2 respectively extend to either side of the washer 40, between a first washer surface 40' complementary to the seat 36 and a second washer surface 40" complementary to the ring 50. The inner lugs L1 and the outer lugs L2 are respectively shaped complementarily to the inner slots S1 of the shaft 60 and the outer slots S2 of the nut 30 for the locking washer 40 to be guided along the slots S1, S2 toward the seat 36. The slots S2 extend radially in the nut 30 from inside the annular gap G1 to outside the nut 30. The outer lugs L2 conversely extend from inside the annular gap G1 to outside the nut 30. This configuration of the nut 30 and of the washer 40 allows to modify a shape and a mass of the washer 40, and hence the natural frequency of the washer 40, across a radial clearance available around the shaft 60 to receive the fastening means at the second mounting location 66". The depicted arrangement of lugs L1, L2 and slots S1, S2 is merely one of numerous possibilities. The washer 40 is constructed so as to withstand centrifugal loads associated with typical rotation speeds about the axis A, such that any radial expansion of the washer 40 occurring under normal use is negligible.

The groove 38 and the ring 50 are configured to selectively hinder passage of the washer 40 across the groove 38 inwardly and outwardly of the recess 30c. With the washer 40 placed in the recess 30c adjacent to the seat 36, the ring 50 can be fitted in the recess 30c so as to extend into the groove 38 to block the slots S2. Unlike the washer 40, the ring 50 is constructed so as to be resiliently expandable in a radially outward direction relative to the axis A under the typical rotation speeds. As such, an outer ring edge 52 circumscribing the ring 50 and defining an outer ring diameter will expand from a nominal diameter to a maximum diameter 52a upon the ring 50 freely rotating about the axis A at high rotation speeds within a range of typical speeds. As previously mentioned, the ring 50 is characterised as being "split" in reference to a disconnect along its circumference, defining mutually opposing ends 54. In the depicted implementation, the ends 54 are spaced apart by a circumferential distance DN upon the ring 50 being at the nominal diameter absent any external load. The ring 50 is resiliently compressible radially inwardly such that the ends 54 are brought toward one another until the ring 50 is circumscribed by a minimum diameter 52b smaller than the nominal diameter. The ring 50 has a wire-like construction with a round radial cross section, although other shapes are contemplated.

Figure 4A:
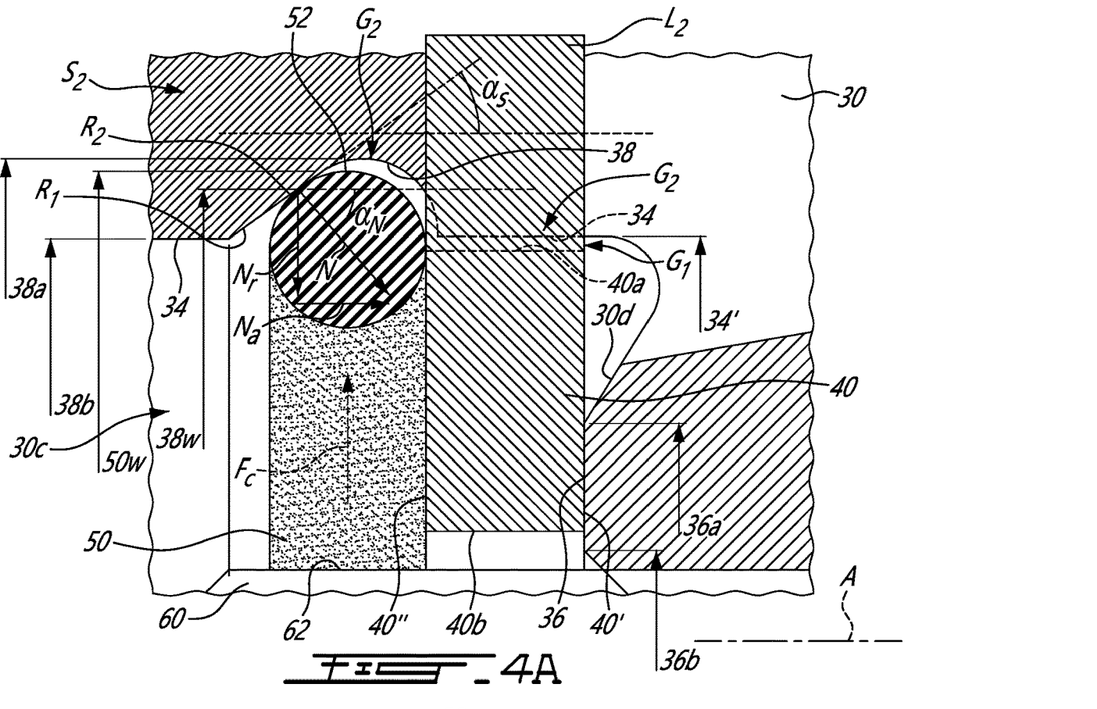
FIG. 4A is an enlarged cross-section view of the portion of the rotor assembly of FIG. 2.

With reference to FIG. 4A, structural and functional relationships between the shaft 60, the washer 40 and the nut 30 will now be described further. In the recess 30c, the nut 30 and the shaft 60 together define an annular gap, shown at G1. The inner nut surface 34 circumscribes the annular gap G1 as it extends away from the seat 36 to the groove 38. The washer 40, the inner nut surface 34 and the outer shaft surface 62 are sized and arranged such that the washer 40 is freely slidable axially across the annular gap G1 while the washer 40 remains radially loose. It should be noted that the washer 40 and the ring 50 are sized so as to as to fit next to one another axially across the annular gap G1. In this position, the washer 40 extends from the seat 36, and the ring 50 extends from the washer 40 to the groove 38. The washer 40 is radially loose relative to the shaft 60, to the nut 30 and to the ring 50, whereas the ring 50 is radially loose relative to the washer 40 and radially engaged with the nut 30 so as to form a wedge between the washer 40 and the groove 38. The wedge may be formed by a suitably shaped surface of either one of both of the groove 38 and the ring 50. One such surface may be a circumferential surface inside the groove 38, referred to as a ramping surface R1 of the groove 38. Stated otherwise, the ring 50 and the ramping surface R1 of the groove 38 are in a wedged configuration in which the ramping surface R1 is cooperable with the ring 50 to axially load the washer 40 against the seat 36 via the ring 50 as the ring 50 is radially loaded against the ramping surface R1. In the wedged configuration, the outer ring edge 52 of the ring 50 has a rated ring diameter 50W smaller than the maximum ring diameter 52a, in this case corresponding to the nominal diameter. A first side of the ring 50 has a first ring edge in contact with the washer 40, and a second side of the ring 50 opposite the first side has a second ring edge in contact with the ramping surface R1. By cooperating with the ramping surface R1, the ring 50 remains resiliently expandable radially outwardly, bringing the outer ring edge 52 deeper into the groove 38.

The seat 36 is a flat, annular surface located inward the second nut side 30" of the nut 30. The seat 36 extends radially inwardly relative to the axis A from an outer seat edge 36a defining an outer seat diameter, to an inner seat edge 36b defining an inner seat diameter, in this case located radially outwardly of the innermost nut surface 30b (FIG. 2) and of its threads. The radial location of the outer seat edge 36a relative to the axis A may be referred to as a first radial location of the nut 30. The seat 36 is located radially closer to the innermost nut surface 30b than to the inner nut surface 34, which positions the seat 36 proximate to the shaft 60. This exemplary arrangement can desirably assist to damp vibration transmitted to the washer 40 via the shaft 60.

A first portion of the inner nut surface 34 proximate to the seat 36 surrounds the seat 36 at a second radial location of the nut 30 radially outward of the first radial location. The first portion of the inner nut surface 34 extends away from the seat 36 to a first edge of the groove 38. A second portion of the inner nut surface 34 extends from a second edge of the groove 38 opposite the first edge toward the second nut side 30". At the second groove edge, the groove 38 extends radially outwardly from the inner nut surface 34 relative to the axis A to an outer groove edge 38a of the groove 38, and circumferentially around the annular gap G1. It shall be noted that the outer groove edge 38a is radially outward of each of the first and the second groove edges. An outer groove diameter defined at the outer groove edge 38a is greater than an inner groove diameter defined at the second groove edge, referred to henceforth as an inner groove edge 38b of the groove 38. The ramping surface R1 is defined on a side of groove groove 38 having the inner (or second) groove edge 38b. In the present embodiment, the ramping surface R1 has the inner groove edge 38a and extends away therefrom toward the outer groove edge 38a. The ramping surface R1 is shaped complementarily to the ring 50 so as to axially deflect the ring 50 toward the seat 36 upon the ring 50 extending radially outwardly so as to load the ramping surface R1 at a rated axial location of the nut 30 at which the ramping surface R1 defines a rated groove diameter 38W. The ramping surface R1 extends away from the seat 36 from a first axial location to a second axial location of the nut 30, with the rated axial location therebetween. In this embodiment, the ramping surface R1 is circumferentially segmented due to the presence of the slots S2 extending across the groove 38. At the rated axial location, the ramping surface R1 extends toward the inner nut surface 34 at a slope angle $\alpha S$ relative to the axis A. The slope angle $\alpha S$ can be described as complementary to a normal angle $\alpha N$ of a normal direction of the ramping surface R1 at the rated axial location relative to the axis A. The ramping surface R1 has at least one of a curved portion being convex relative to the axis A and a tapered (or conical) portion tapering toward the axis A away from the seat 36 which, at the rated axial location, faces toward the seat 36 at the normal angle $\alpha N$. In this embodiment, the ramping surface R1 has an exemplary tapered shape tapering from an outer ramp edge radially inward of the outer groove edge 38a to an inner ramp edge being the inner groove edge 38b. The ramping surface R1 is shaped such that the rated axial location defining the rated groove diameter 38W is spaced inbetween the outer and inner ramp edges. Depending on the implementation of the groove 38, the rated axial location can otherwise correspond to the inner groove edge 38b, and the outer groove edge 38a can otherwise correspond to the outer ramp edge.

The outer washer surface 40a circumscribing the annular body of the washer 40 has a diameter that is smaller than that of the inner nut surface 34 radially outward of the seat 36. The inner washer surface 40b in this case has a diameter being greater than that of the inner seat edge 36b. In the depicted exemplary implementation of the washer 40, a radial cross section of the locking washer 40 is generally rectangular in shape, both at angular locations intercepting solely the annular body and at other angular locations intercepting one or more lugs L1, L2. Radially outer washer edges on either side of the washer 40 respectively circumscribe the first washer surface 40' and the second washer surface 40" and have a first washer diameter and a second washer diameter both corresponding to the diameter of the outer washer surface 40a. Other shapes of the washer 40 are possible, provided that a suitable cooperation with the nut 30 and with the ring 50 is possible to allow a suitable loading of the washer 40 against the nut 30 while the washer 40 remains radially free relative to the nut 30 and to the ring 50. For example, the outer washer surface 40a of the washer 40 may curve or taper as it extends between the first and second damper surfaces 40', 40", and either one or both of the radially outer washer edges may be beveled or curved.

Figure 4B:
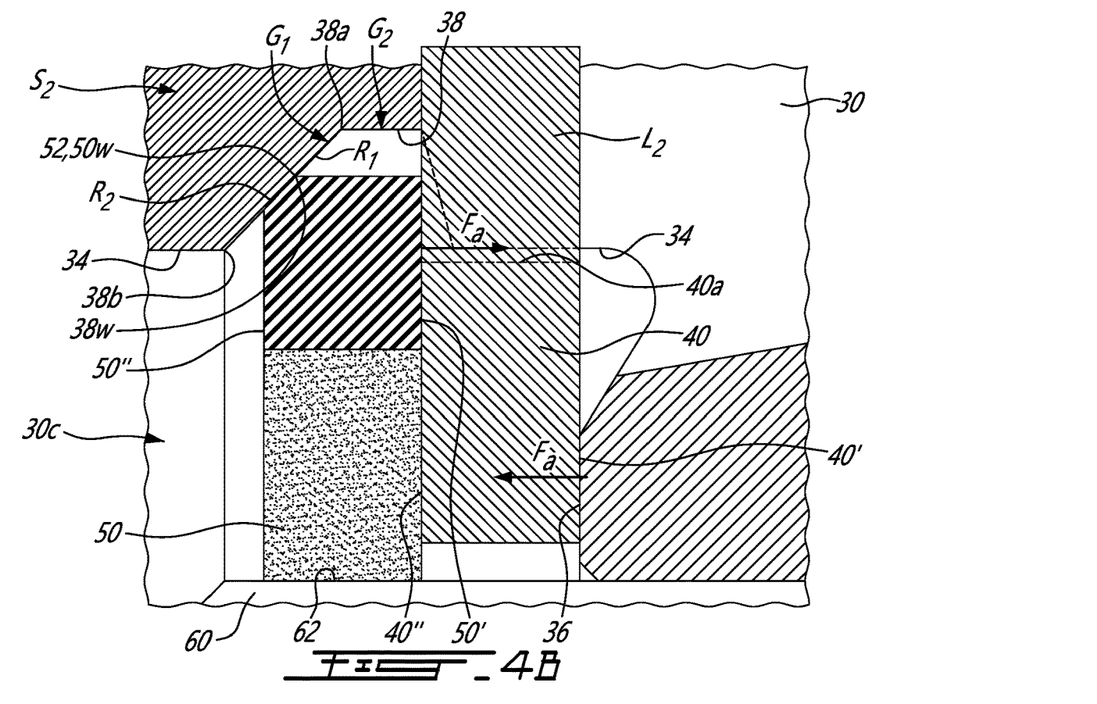
FIG. 4B is an enlarged cross-section view of a portion of another embodiment of the gas turbine engine rotor assembly including a split ring having a tapered surface.

The above mentioned suitable loading of the washer 40 refers to an axial load to be exerted by the first washer surface 40' against the seat 36 having a magnitude greater than a minimum threshold from which friction between the first washer surface 40' and the seat 36 is sufficient for friction damping to occur, and yet lower than a maximum threshold from which binding of the washer 40 is deemed possible. The suitable cooperation refers to structural characteristics of the nut 30, the washer 40 and the ring 50 rendering the ring 50 capable of being expandable radially outwardly against the ramping surface R1 of the groove 38 outward of the rated axial location so as to deflect axially away from the ramping surface R1 and toward the seat 36 to exert the axial load onto the washer 40. With the ring 50 in the wedged configuration absent any centrifugal load, the ring 50 is circumscribed by the outer ring edge 52 having a rated ring diameter 50W and is in contact with the groove 38 at the rated axial location defining the rated groove diameter 38W. A first ring edge of the ring 50 axially inward of the outer ring edge 52 contacts the washer 40 so as to be radially free relative to the washer 40, whereas a second ring edge of the ring 50 axially outward of the outer ring edge 52 defines a ramping surface R2 of the ring 50 contacting the groove 38 at the rated axial location. Under centrifugal load, the ring 50 deflects toward the seat 36 against the washer 40 as the ramping surface R2 of the ring 50 follows the ramping surface R1 of the groove 38. In the depicted exemplary implementation of the ring 50, the rated ring diameter 50W is greater than the rated groove diameter 38W, and the outer ring edge 52 is radially free relative to the groove 38 and relative to the inner nut surface 34. Alternate implementations are possible, for example as shown in FIG. 4B and described hereinbelow.

It shall be noted that the inner nut surface 34, the washer 40 and the ring 50 are sized and arranged such that a radial gap G2 is defined from around the washer 40 at the seat 36 to around the ring 50 at the rated axial position where the groove 38 has the rated groove diameter 38W. The inner nut surface 34 circumscribes a first portion of the radial gap G2 as it extends away from the seat 36 and around the locking washer 40, from around the first washer surface 40' to around the second washer surface 40". As the inner nut surface 34 extends away from the washer 40 to the groove 38, the inner nut surface 34 circumscribes a second portion of the radial gap G2 surrounding the ring 50. A remainder of the radial gap G2 surrounding the ring 50 is circumscribed by the groove 38 as the groove 38 extends from the rated axial location to the outer groove edge 38a. The remainder of the radial gap G2 is further circumscribed by the groove 38 extending from the outer groove edge 38a to the first edge of the groove 38 at the junction of the groove 38 with the inner nut surface 34. The ramping surface R1 of the groove 38 can also be said to circumscribe the radial gap G2 surrounding the ring 50, at least between the rated axial location, where the ramping surface R1 circumferentially contacts the second ring edge of the ring 50, to the outer ramp edge, where the ramping surface R1 is radially outward of the outer ring diameter of the outer ring edge 52.

In the depicted exemplary implementation of the rotor assembly 20, the recess 30c includes an annular pocket 30d surrounding the seat 36 and extending axially past the seat 36. The annular pocket 30d extends from the outer seat edge 36a to the inner nut surface 34, where the inner nut surface 34 has a first inner nut diameter 34' spaced radially outward from the seat 36. From the first inner nut diameter 34', the inner nut surface 34 extends to the first edge of the groove 38, where it defines a second inner nut diameter in this case corresponding to the first inner nut diameter 34'. Other shapes are contemplated for the surfaces defining the recess 30c between the seat 36 and the groove 38, so long as suitably sized annular and radial gaps G1, G2 are provided relative to a suitably sized seat 36.

Whereas the washer 40 is axially engaged with the seat 36 and with the ring 50, the washer 40 remains free to vibrate radially relative to the inner nut surface 34 and to the ring 50. Stated otherwise, the outer washer surface defining the outer washer diameter 40a is radially displaceable in the radial gap G2 between a nominal radial position and a rated radial position outward of the nominal position yet inward of the inner nut surface 34. Such radial displacement of the washer 40 takes into account vibration amplitude and any deformation of the washer 40 due to torsion, compression and/or heating. In use, as the washer 40 vibrates, friction occurs between the first washer surface 40' of the washer 40 and the seat 36, thus providing frictionnal damping of the washer 40. Principles of frictionnal damping as applied to gas turbine engine rotary parts are described in U.S. Pat. No. 10,502,061, the contents of which are hereby incorporated by reference.

In the wedged configuration, radially expanding the ring 50 to a diameter greater than the rated ring diameter 50W deflects the ring 50 along the groove 38 and toward the washer 40. Upon the rotor assembly 20 rotating about the axis A such that the ring 50 bears a centrifugal force Fc, the ring 50 is loaded against the groove 38 such that a reaction force normal to the groove 38, a normal force N, is exerted against the ring 50. At the rated axial location defining the rated groove diameter 38W, the normal force N is oriented at the normal angle αN relative to the axis A. As such, the normal force N can be represented as a radial component (or radial reaction force) Nr and in an axial force component (or axial reaction force) Na. Under the axial reaction force Na, the ring 50 exerts an axial force Fa of a corresponding magnitude onto the washer 40 and, ultimately, onto the seat 36.

Hence, the groove 38, the ring 50 and the washer 40 can be said to be cooperable to convert the centrifugal force Fc exerted by the ring 50 against the groove 38 to the axial force Fa exerted by the washer 40 against the seat 36. The magnitude of the axial force Fa is a function of a plurality of parameters of the rotor assembly 20, one or more of which can be set to a desired value so as to obtain a desired magnitude of the axial force Fa. For example, the centrifugal force Fc can be obtained based on the following equation:

$$F_c = mr\omega^2$$

where m corresponds to a mass of the ring 50, r corresponds to a radius of curvature defined by the ring 50 relative to the axis A, and ω corresponds to a rotation speed of the rotor assembly 20 (and hence of the ring 50) about the axis A. Therefore, in view of a range of rotation speeds of the rotor assembly 20 for a given implementation, any one or more of the parameters including the normal angle αN (and the slope angle αS complementary thereto), the mass m and the radius of curvature r of the ring 50 can be set to produce a desired range of axial force values, or magnitudes, for the axial force Fa. The desired range of axial force values can include a given value sufficient for producing a desired level of friction damping for a given rotation speed of the range of rotation speeds. The desired range of axial force values can also be determined so as to be lower than an axial force value at which the resulting friction between the washer 40 and the seat 36 is susceptible to bind the washer 40. In some applications, binding the washer will restrict the washer movement and will result in significant increase of the washer natural frequencies making them higher than the excitation source frequency. Therefore no resonance will occur. The limitation for the amount of axial force is mainly to avoid excessive load on the washer 40 that could otherwise create structural damage and ensure that the ring 50 can slide along the conical slope of the nut and apply axial force Fa onto the locking washer 40.

Other parameters having an effect on the level of friction damping achieveable at a given rotation speed include a size of a first frictional interface (or first frictional engagement area) defined by the seat 36 and the first washer surface 40', a first friction coefficient of the first frictional interface, a size of a second frictional interface (or second frictional engagement area) defined by the second washer surface 40" and the ring 50, a second friction coefficient of the second frictional interface, a size of a third frictionnal interface (or third frictional engagement area) defined by the ramping surface R2 of the ring 50 and the ramping surface R1 of the groove 38, a third friction coefficient of the third frictional interface. It is noted that damping of the washer is achieved by slippage in the radial direction—washer has radial mode shapes of vibration (any given point of a washer moves radially up and down); and axial mode shapes are restricted by the ring 50. For instance, the ramping surface R1 can be set such that a tangent of the slope angle αS is equal to or greater than the third friction coefficient. The slope angle to ensure that ring 50 will slide along the slope and apply axial load Fa onto the washer 40 is the main requirement for the damping to occur.

In FIG. 4B, there is shown another embodiment of the rotor assembly 20, in which the radial cross section of the ring 50 is non-circular. The ring 50 is shown in the wedged configuration, with the rated ring diameter 50W in this case corresponding to the rated groove diameter 38W. On either side, the ring 50 is provided with first and second ring surfaces 50', 50", with the first ring surface 50', defining the first ring edge, laid flat against the second washer surface 40" of the washer 40. It should be noted that the ramping surface R2 of the ring 50 is shaped complementarily to the ramping surface R1 of the groove 38. In this exemplary implementation, the ramping surface R2 is tapered, or conical, and the ramping surfaces R1, R2 taper at a same angle. In other implementations, the ramping surfaces R1, R2 may taper at angles being different yet suitable for the ring 50 to be cooperable with the groove 38. It shall be noted that the ramping surface R1 of the groove 38 tapers from the outer ramp edge corresponding to the outer groove edge 38a, to the inner ramp edge corresponding to the inner groove edge 38b. It is also contemplated that in certain implementations, the ramping surface R1 of the groove 38 may be curved, at least in part. The ramping surface R2 of the ring 50 in this case extends from the outer ring edge 52 to the second ring surface 50". The outer ring edge 52 is thus part of the ramping surface R2 and engages the groove 38 at the rated axial location. The second ring edge is in this case defined at a junction between the ramping surface R2 and the second ring surface 50". It is contemplated that in alternate implementations, the ramping surface R2 may be spaced radially inwardly relative to the outer ring edge 52.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, friction damping features consistent with the above can be implemented in rotor assemblies in which various types and shapes are possible for the locking washer and for the rotary parts rotationally interlocked therewith. Depending on amplitude and direction of vibratory stress borne by the locking washer, size, shape and relative position of either component of the rotor assembly may vary. Yet further modifications could be implemented by a person of ordinary skill in the art in view of the present disclosure, which modifications would be within the scope of the present technology.

The invention claimed is:

1. A gas turbine engine rotor assembly having a rotation axis, the rotor assembly comprising:
   a first body about the rotation axis, the first body having an inner surface radially inward relative to the rotation axis and a seat axially inward the first body and surrounded by the inner surface, the first body having a groove extending circumferentially into the inner surface and spaced axially from the seat, the groove having an inner groove edge proximate to the inner surface and an outer groove edge circumscribing the groove radially outward of the inner surface, the groove at a rated axial location of the first body between the inner groove edge and the outer groove edge facing toward the seat at a normal angle relative to the rotation axis;
   a second body about the rotation axis, the second body having an outer surface radially outward relative to the rotation axis and surrounded by the inner surface, an annular gap defined radially between the inner surface and the outer surface and axially between the seat and the groove;
   a locking washer about the rotation axis in anti-rotational engagement with the inner surface and the outer surface relative to the rotation axis, the locking washer having axially opposite first and second washer surfaces in the annular gap, the first washer surface adjacent to the seat; and a split ring disposed about the rotation axis in the annular gap adjacent to the second washer surface, the split ring having an outer ring edge radially outward relative to the rotation axis, the outer ring edge located inside the groove radially inward of the outer groove edge, the split ring radially engaging the groove at the axial location and resiliently expandable radially outwardly under centrifugal load relative to the rotation axis such that expanding the split ring radially against the groove axially deflects the split ring toward the seat relative to the first body and to the second body so as to axially load the locking washer against the seat.

2. The rotor assembly of claim 1, wherein the split ring is resiliently compressible radially inwardly such that the outer ring edge fits radially inward of the inner groove edge.

3. The rotor assembly of claim 1, wherein the seat is spaced radially inward relative to the groove.

4. The rotor assembly of claim 1, wherein the groove has a groove ramping surface extending between a first axial location and a second location of the first body relative to the rotation axis, the first axial location being radially outward of the second axial location and radially inward of the outer groove edge, the inner groove edge being at the second axial location, and the rated location is between the first axial location and the second axial location.

5. The rotor assembly of claim 4, wherein the outer ring edge is located radially outward of the first axial location upon the split ring radially engaging the groove at the rated axial location.

6. The rotor assembly of claim 4, wherein the groove ramping surface tapers as it extends from the first axial location to the rated axial location.

7. The rotor assembly of claim 4, wherein the split ring has a ring ramping surface shaped complementarily to the groove ramping surface.

8. The rotor assembly of claim 4, wherein the groove circumscribes a radial gap surrounding the split ring as the groove extends from the rated axial location to the outer groove edge.

9. The rotor assembly of claim 1, wherein the inner surface circumscribes a radial gap surrounding the locking washer as the inner surface extends from around the first washer surface to around the second washer surface.

10. The rotor assembly of claim 9, wherein the inner surface and the outer surface are sized such that the locking washer is displaceable between a nominal radial position and a rated radial position in the radial gap unhindered by the inner surface and the outer surface.

11. The rotor assembly of claim 10, wherein the radial gap is a first radial gap, and the outer surface is surrounded by a second radial gap circumscribed by the locking washer.

12. The rotor assembly of claim 10, wherein the locking washer has an outer washer surface, outer lugs projecting radially outwardly from the outer washer surface, an inner washer surface and inner lugs projecting radially inwardly from the inner washer surface, the inner surface and the outer surface respectively having first slots and second slots sized for slidably receiving the outer lugs and the inner lugs such that the locking washer is displaceable between the nominal radial position and the rated radial position unhindered by the first slots and the second slots.

13. The rotor assembly of claim 12, wherein the seat is spaced radially inward relative to the outer washer surface.

14. The rotor assembly of claim 1, wherein the split ring is in a wedged configuration between the groove at the rated axial location and the second washer surface.

15. A gas turbine engine rotor assembly defining a rotation axis, the rotor assembly comprising:

a nut about the rotation axis, the nut having a recess defined radially by an inner nut surface radially inward relative to the rotation axis, a seat inside the recess axially inward the nut and surrounded by the inner nut surface, the nut having a groove spaced axially from the seat and extending radially outwardly into the inner nut surface, the groove having an outer groove edge circumscribing the groove and a groove ramping surface radially inward of the outer groove edge, the groove ramping surface tapering radially inwardly from an outer ramp edge to an inner ramp edge;

a shaft about the rotation axis in the recess, the shaft having an outer shaft surface radially outward relative to the rotation axis and surrounded by the inner nut surface, an annular gap defined radially between the inner nut surface and the shaft outer surface and axially between the seat and the groove;

a locking washer about the rotation axis in anti-rotational engagement with the inner nut surface and the shaft outer surface relative to the rotation axis, the locking washer having axially opposite first and second washer surfaces in the annular gap, the first washer surface adjacent to the seat; and a split ring disposed about the rotation axis in the annular gap adjacent to the second washer surface, the split ring having an outer ring edge radially outward relative to the rotation axis, the outer ring edge located inside the groove radially inward of the outer groove edge, the split ring radially engaging the groove ramping surface, the split ring resiliently expandable radially outwardly under centrifugal load relative to the rotation axis such that expanding the split ring radially against the groove ramping surface axially deflects the split ring toward the seat relative to the nut and to the shaft so as to axially load the locking washer against the seat.

16. The rotor assembly of claim 15, wherein the seat is radially closer to the outer shaft surface than to the inner nut surface.

17. The rotor assembly of claim 15, further comprising a gear mounted to the shaft about the rotation axis proximate to the nut, the nut sized to fit radially inward of an inner meshing diameter of the gear.

18. The rotor assembly of claim 17, wherein the locking washer has an outer washer surface, outer lugs projecting radially outwardly from the outer washer surface, an inner washer surface and inner lugs projecting radially inwardly from the inner washer surface, the inner nut surface and the shaft outer surface respectively having nut slots and shaft slots sized for slidably receiving the outer lugs and the inner lugs, the gear mounted to the shaft via the shaft slots.

19. The rotor assembly of claim 18, wherein an annular portion of the locking washer extends radially between the seat and the ring.

20. The rotor assembly of claim 18, wherein the outer lugs extend radially outwardly from inside the annular gap to outside the nut.

* * * * *